United States Patent

[11] 3,622,174

| [72] | Inventors | Raymond G. Wakeen<br>La Crosse, Wis.;<br>Richard G. Moe, La Porte, Ind. |
|---|---|---|
| [21] | Appl. No. | 24,502 |
| [22] | Filed | Apr. 1, 1970 |
| [45] | Patented | Nov. 23, 1971 |
| [73] | Assignee | Allis-Chalmers Manufacturing Company<br>Milwaukee, Wis. |

[54] GRILL GUARD
1 Claim, 3 Drawing Figs.

| [52] | U.S. Cl. | 280/150 F |
|---|---|---|
| [51] | Int. Cl. | B60r 11/00 |
| [50] | Field of Search | 280/150 R,<br>150 E, 150 F; 293/64, 60; 296/43 |

[56] References Cited
UNITED STATES PATENTS

| 2,846,095 | 8/1958 | Sonneman et al. | 280/150 F |
|---|---|---|---|
| 2,704,498 | 3/1955 | Furnas | 280/150 R |
| 817,517 | 4/1906 | Rands | 296/43 |
| 3,032,352 | 5/1962 | Barrett | 280/150 E |
| 623,043 | 4/1899 | Selzer | 296/43 |

*Primary Examiner*—Benjamin Hersh
*Assistant Examiner*—Robert R. Song
*Attorneys*—Kenneth C. McKivett, Arthur L. Nelson and Robert B. Benson ABSTRACT: A readily removable or mountable grill guard for a tractor wherein the guard is provided with tapered depending members received within complementary sockets carried by the tractor and such frictional connection between socket and member forming the only connection between tractor and guard.

PATENTED NOV 23 1971

3,622,174

Inventor
Raymond G. Wakeen
Richard G. Pepe
By Kenneth McKnight
Attorney

GRILL GUARD

This invention relates to grill guards.

A principal object of this invention is to provide a grill guard for a tractor which guard can be readily positioned on the tractor for preventing damage to the grill thereof.

A further object of this invention is to provide a readily removable grill guard for a tractor having a hood pivotally mounted at the forward end thereof.

With tractors having front-mounted loaders, it is customary to provide the grill of such tractors with a guard to prevent material dropping from the loader from damaging the grill or radiator positioned immediately behind the grill. In the ordinary tractor loader combination, the hood is either raised from the side or does not have any hood and in this type of tractor the grill guard is usually bolted to the forward end of the tractor.

With the present invention, the tractor forming the environment for the invention is provided with a forwardly pivoting hood which necessitates the removal of the grill guard before such hood may be pivoted. This tractor is also provided at its forward end with a bracket for holding weights and when such tractor is equipped with a front loader it is desirable that the weights be removed from the front end of the tractor as the loader itself provides sufficient weight for the front end of the tractor. Accordingly, the weights and weight holding bracket which is bolted to the front end of the tractor are removed and replaced by a pair of socket members attached to the front end of the tractor in the same bolt holes as used for the weights bracket. These socket members support the grill guard.

A further object of this invention is to provide a readily removable grill guard which is supported and retained in sockets solely by the weight of the grill guard and configuration of the socket so that the grill guard can be readily inserted and removed from the socket manually without the aid of tools.

Other objects and advantages of the invention will be apparent from a consideration of the following specification taken in conjunction with the accompanying drawing wherein.

Figure 1:
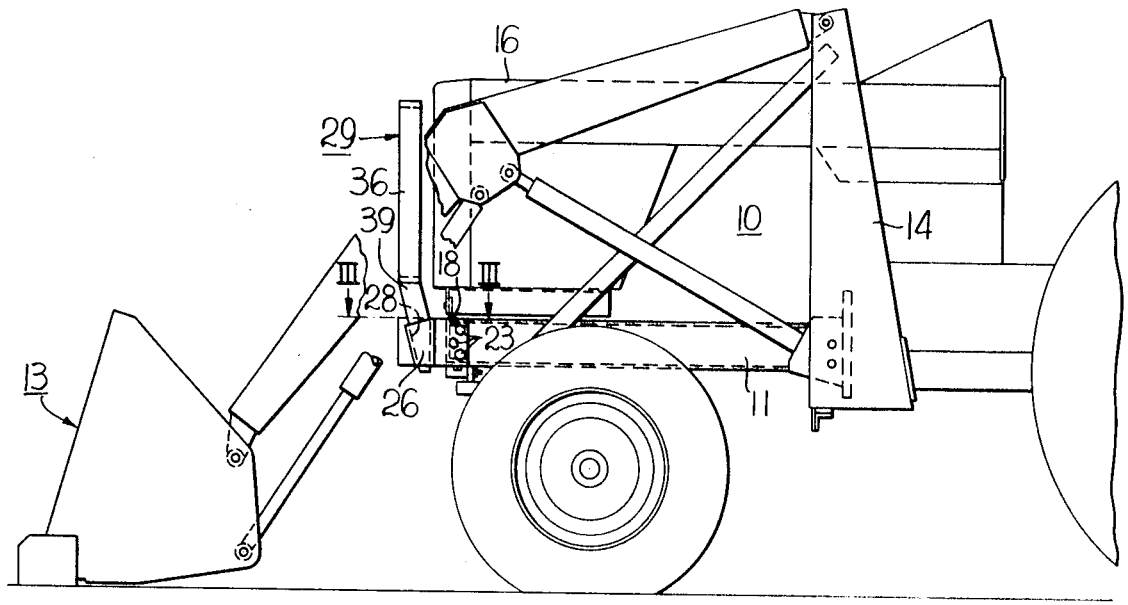
FIG. 1 is a side elevation of a tractor front loader combination embodying the invention.
Figure 3:
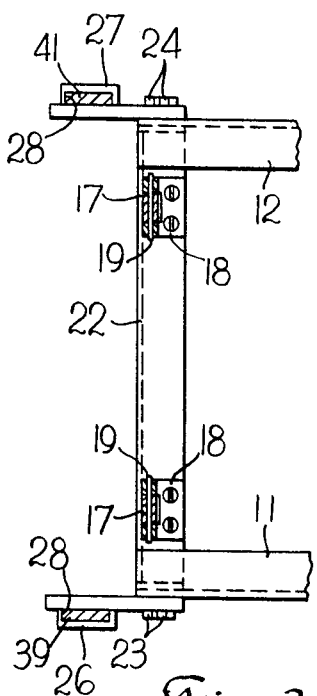
FIG. 3 is a section view taken on line III—III of Fig. 1.

Referring to the drawing, Fig. 1 shows the front portion of a tractor 10 having a pair of longitudinally extending main frame members 11 and 12 (see Fig. 3). A front loader 13 is pivotally mounted on the upper ends of a pair of upright transversely spaced members 14 (only one of which is shown). The lower ends of members 14 are attached to frame members 11 and 12.

Tractor 10 is provided with a pivotally mounted hood 16 which has hinge elements 17 attached to the lower forward end thereof which mesh with hinge elements 18 carried by transversely extending frame 22 and which hinges elements 17 and 18 are connected by pivot pin 19. When the operator of the tractor desires to gain access to the motor, battery or other accessories, he does so by pivoting hood 16 about transversely extending pivot pins 19.

The forward end of hood 16 is provided with a grill 21 which is normally positioned forward of the tractor radiator (not shown) and is of a meshlike construction permitting air to flow therethrough to the tractor radiator.

The forward ends of frame members 11 and 12 are joined by transversely extending frame 22. A weight carrying member (not shown) is ordinarily carried forward of frame 22 and is attached to the sides of frame members 11 and 12 by means of bolts 23 and 24, respectively. When tractor 10 is to be operated with a front end loader 13 it is desirable to remove the weight carrying member from the front end of the tractor as the front end loader makes the forward portion of the tractor sufficiently heavy without the addition of any extra weights. This weight carrying member is removed by removing bolts 23 and 24 from frame members 11 and 12 respectively. Then with these same bolts 23 and 24 socket members 26 and 27 are attached to frame members 11 and 12 respectively.

Figure 2:
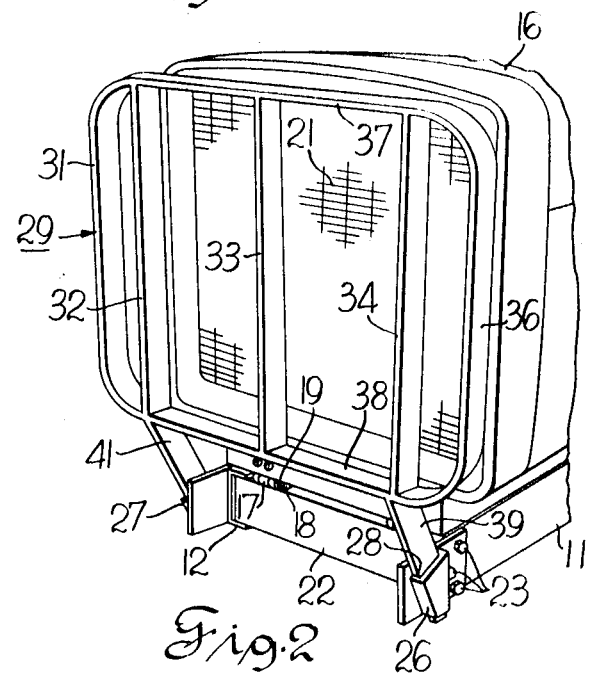
FIG. 2 is a perspective view of a portion of the front end of the tractor.

As shown in Figs. 1 and 2, socket members 26 and 27 are provided with tapered openings 28 therein which taper toward the bottom to provide a larger opening at the top than at the bottom.

A grill guard 29 as shown consists of an open substantially rigid frame formed of five transversely spaced vertical members 31, 32, 33, 34, and 36 joined by upper and lower transverse members 37 and 38, respectively. A pair of transversely spaced depending members 39 and 41 are attached at their upper ends to transverse member 38. The lower ends of depending members 39 and 41 are tapered to provide a configuration complementary to the opening 28 in sockets 26 and 27.

The weight of grill guard 29 is such that it can be readily handled by the tractor operator. If the tractor operator desires to raise hood 16 of the tractor, all that is necessary is that the operator raise guard 29 and withdraw depending members 39 and 41 from socket members 26 and 27. The guard 29 can now be placed on the ground and the operator is now able to pivot hood 16 counterclockwise as viewed in Fig. 1 about pivot pins 19 to provide access to the tractor engine and accessories lying beneath hood 16.

Grill guard 29 is readily replaceable. The operator merely inserts the lower ends of depending members 39 and 41 into sockets 26 and 27 respectively, and permits the weight of the grill to provide a jamming action in tapered openings 28 for retaining the grill in position. Thus a quick-disconnect grill guard is achieved by using a wedge or inclined plane principle to position and anchor the guard without additional fasteners. Complementary openings 28 also provide self-alignment of the grill 29 plus a sturdy anchor point.

We claim:

1. In combination with a tractor having a forwardly pivoting hood and a bracket for holding weights positioned at the forward end of said tractor, a grill guard adapted to be readily positioned at the front end of said tractor for protecting the grill and radiator of said tractor and said guard comprising an open rigid frame including a pair of transversely spaced members slidably received within a pair of socket members complementary to said depending members, said socket members being attached to said tractor in place of said bracket, the lower ends of said transversely spaced members being tapered to decrease the cross-sectional area of said transversely spaced members as the lower ends thereof are approached and said socket members being provided with a complementary taper to receive said transversely spaced members, the sole means for retaining said grill guard in position on said tractor being the frictional fit between said transversely spaced members and said sockets.

* * * * *